(12) United States Patent
Sherman et al.

(10) Patent No.: US 9,724,912 B2
(45) Date of Patent: Aug. 8, 2017

(54) DROPLET GENERATOR FOR A CONTINUOUS STREAM INK JET PRINTHEAD

(71) Applicant: VIDEOJET TECHNOLOGIES INC., Wood Dale, IL (US)

(72) Inventors: Nigel Sherman, Suffolk (GB); Trevor Lye, Cambridge (GB)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 14/900,838

(22) PCT Filed: Aug. 27, 2014

(86) PCT No.: PCT/US2014/052916
§ 371 (c)(1),
(2) Date: Dec. 22, 2015

(87) PCT Pub. No.: WO2015/031485
PCT Pub. Date: Mar. 5, 2015

(65) Prior Publication Data
US 2016/0152023 A1 Jun. 2, 2016

Related U.S. Application Data

(60) Provisional application No. 61/870,474, filed on Aug. 27, 2013.

(51) Int. Cl.
*B41J 2/03* (2006.01)
*B41J 2/25* (2006.01)
*B23K 26/21* (2014.01)
*B23K 26/00* (2014.01)
(Continued)

(52) U.S. Cl.
CPC ............. *B41J 2/03* (2013.01); *B23K 26/0081* (2013.01); *B23K 26/21* (2015.10); *B41J 2/025* (2013.01); *B41J 2/1612* (2013.01); *B41J 2/1634* (2013.01)

(58) Field of Classification Search
CPC . B41J 2/03; B41J 2/1634; B41J 2/1612; B41J 2/025; B23K 26/0081; B23K 26/21
See application file for complete search history.

(56) References Cited

U.S. PATENT DOCUMENTS 5,912,686 A * 6/1999 Palmer ..................... B41J 2/025
347/75
6,883,899 B2 * 4/2005 Pannu ..................... B41J 2/025
347/54

FOREIGN PATENT DOCUMENTS

| EP | 1800866 | 6/2007 |
| WO | 9612622 | 5/1996 |
| WO | 2010146473 | 12/2010 |

* cited by examiner

*Primary Examiner* — Bradley Thies
(74) *Attorney, Agent, or Firm* — Robert L. Wolter; Beusse, Wolter, Sanks & Maire PLLC

(57) ABSTRACT

A droplet generator for a continuous stream ink jet printhead includes an elongate cavity for containing ink and nozzle orifices in fluid communication with the cavity for passing the ink from the cavity to form jets. The nozzle orifices extend along a length of the cavity. A mounting plate provides a wall of the cavity opposite the nozzle orifices. A plurality of actuators is disposed in the cavity to vibrate the ink in the cavity such that each jet breaks up into ink droplets at substantially a same predetermined distance from the wall. Each of the plurality of actuators is integrally connected to the mounting plate by a membrane.

17 Claims, 6 Drawing Sheets

(51) Int. Cl.
*B41J 2/16* (2006.01)
*B41J 2/025* (2006.01)

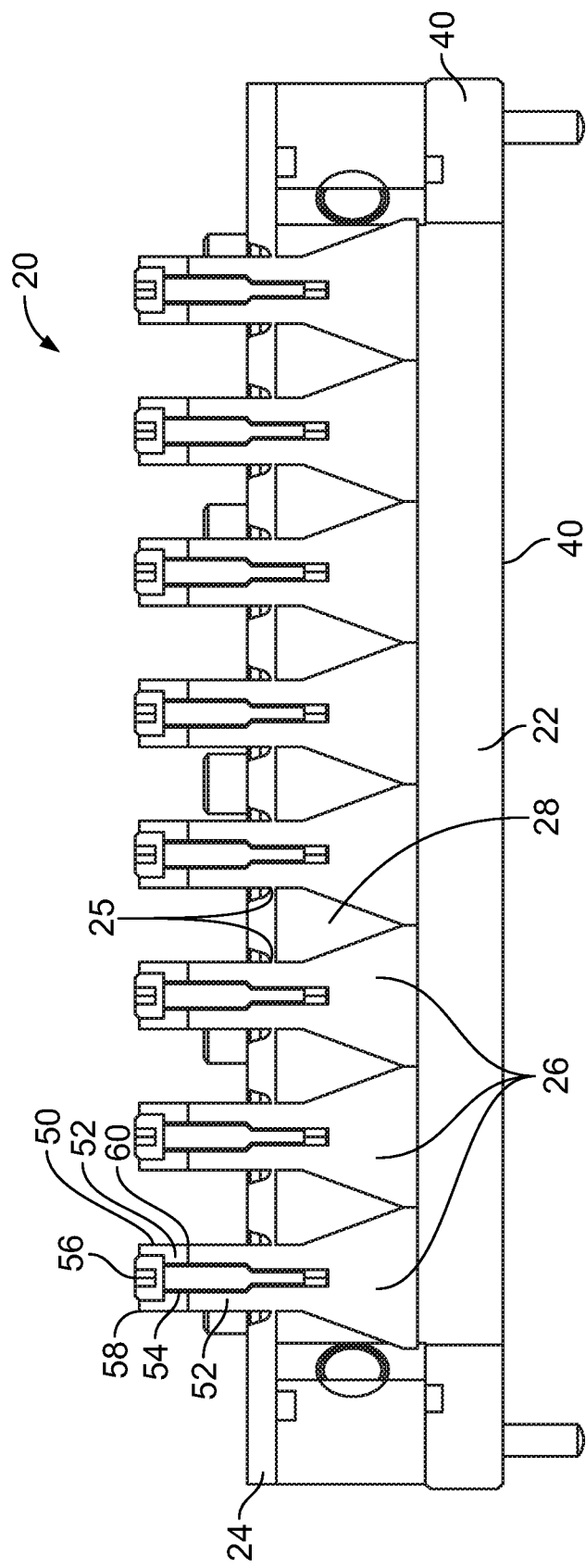

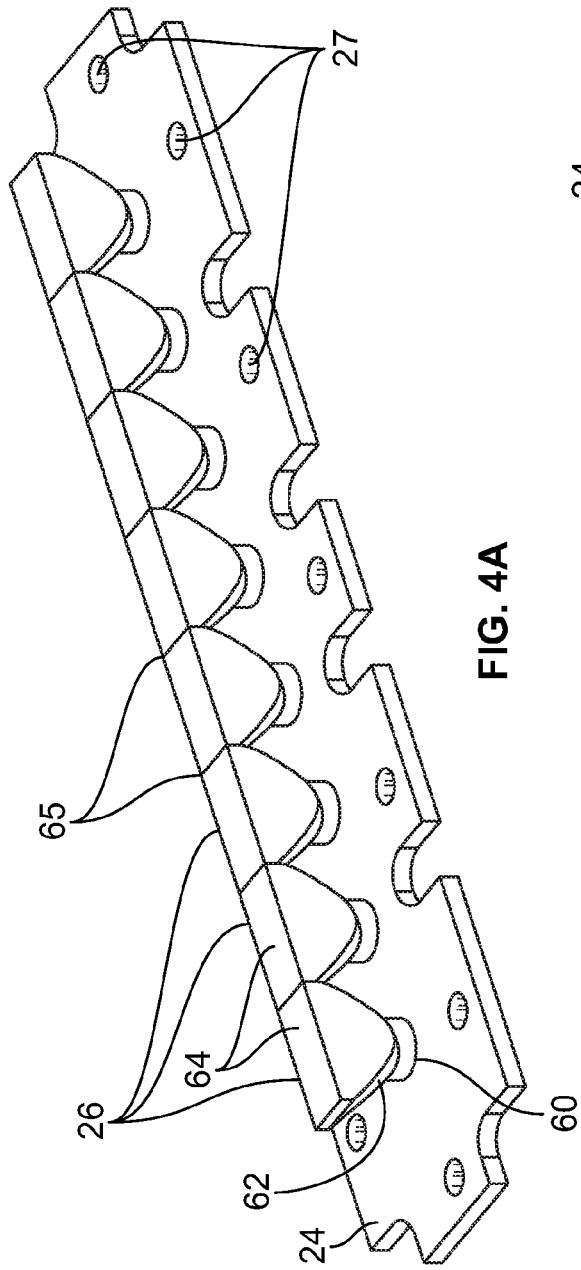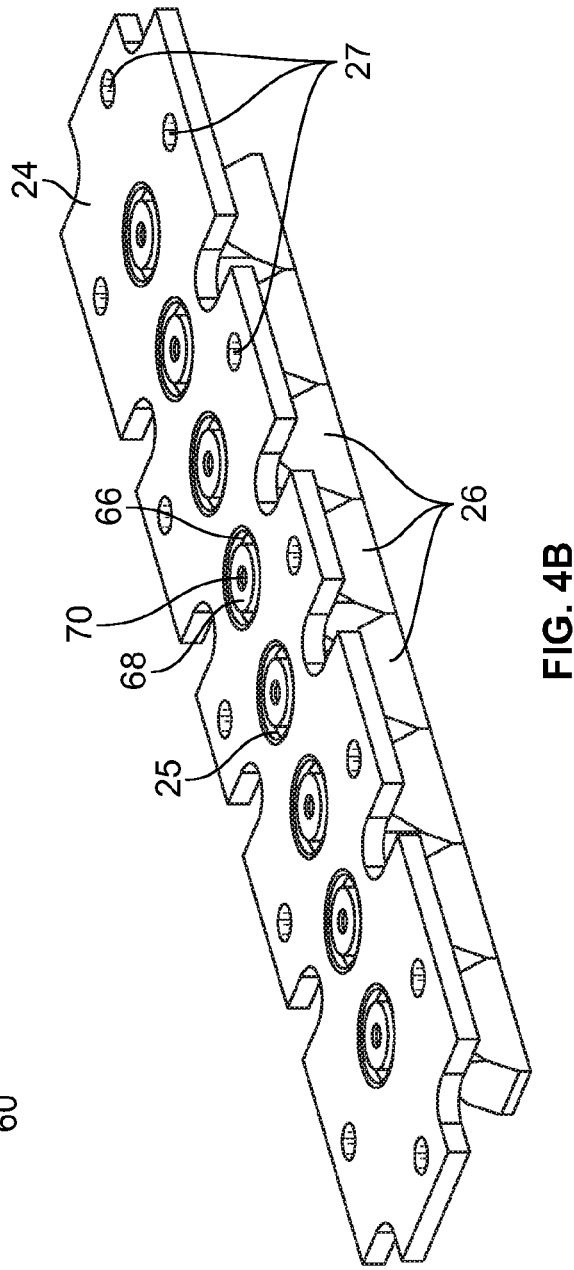

DROPLET GENERATOR FOR A CONTINUOUS STREAM INK JET PRINTHEAD

BACKGROUND

The present disclosure relates to a droplet generator for a continuous stream ink jet printhead, particularly for a binary array printhead.

Continuous ink jet (CIJ) is a form of ink jet that operates on the theory of selectively charging and deflecting drops in flight. Drops are continuously generated at the nozzle by inducing break-off from a pressurized continuous stream of ink in the presence of a variable electrostatic field created by a charging electrode that places a discrete charge on selected drops. Drops subsequently pass through an electrostatic field wherein the field potential induces deflection on the charged drops in order to direct them to print or direct them into an ink catcher to be reused in the ink system. This same mechanism is often used in binary array CIJ printing which is a type of inkjet that includes an array of jets and that can print at relatively high resolutions of at least 128 by 128 dots per inch (dpi).

Binary printheads use actuators to vibrate ink and eject droplets thereof from the printhead. The actuators need to be precisely situated for the printhead to work properly. A difficulty in prior art actuators is that the components are manufactured separately and then assembled. Manufacturing and assembly variations lead to poor jet break-up uniformity. Consequently, a very high accuracy is required of the physical dimensions of the structural components of the generator. Further, very little stray is permitted in operating parameters of the generator such as ink composition and temperature.

BRIEF SUMMARY

The present disclosure provides a droplet generator for a continuous stream ink jet printhead. The droplet generator includes an elongate cavity for containing ink and a plurality of actuators disposed in the cavity to vibrate the ink in the cavity. Each of the plurality of actuators is integrally connected to the mounting plate by a membrane. The mounting plate and integrated actuators are preferably manufactured by laser metal sintering or laser metal melting.

In one aspect, a droplet generator for a continuous stream ink jet printhead includes an elongate cavity for containing ink and nozzle orifices in fluid communication with the cavity for passing the ink from the cavity to form jets. The nozzle orifices extend along a length of the cavity. A mounting plate provides a wall of the cavity opposite the nozzle orifices. A plurality of actuators is disposed in the cavity to vibrate the ink in the cavity such that each jet breaks up into ink droplets at substantially a same predetermined distance from the wall. Each of the plurality of actuators is integrally connected to the mounting plate by a membrane.

In another aspect, method of manufacturing a droplet generator for a continuous stream ink jet printhead includes providing an elongate cavity for containing ink and manufacturing by laser sintering a mounting plate providing a wall of the cavity and a plurality of actuators integrally connected to the mounting plate by a membrane, where the membrane is less than 500 micron thick. Nozzle orifices are provided for passing the ink from the cavity to form jets. The nozzle orifices extend along a length of the cavity. The actuators are adapted to be disposed in the cavity to vibrate the ink in the cavity to form jets, the nozzle orifices extending along a length of the cavity.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 3 is a cross sectional view of an embodiment of a droplet generator.

FIG. 4A is a bottom view of a mounting plate and actuators of the droplet generator of FIG. 3.

FIG. 4B is a top view of a mounting plate and actuators of the droplet generator of FIG. 3.

DETAILED DESCRIPTION

Figure 1:
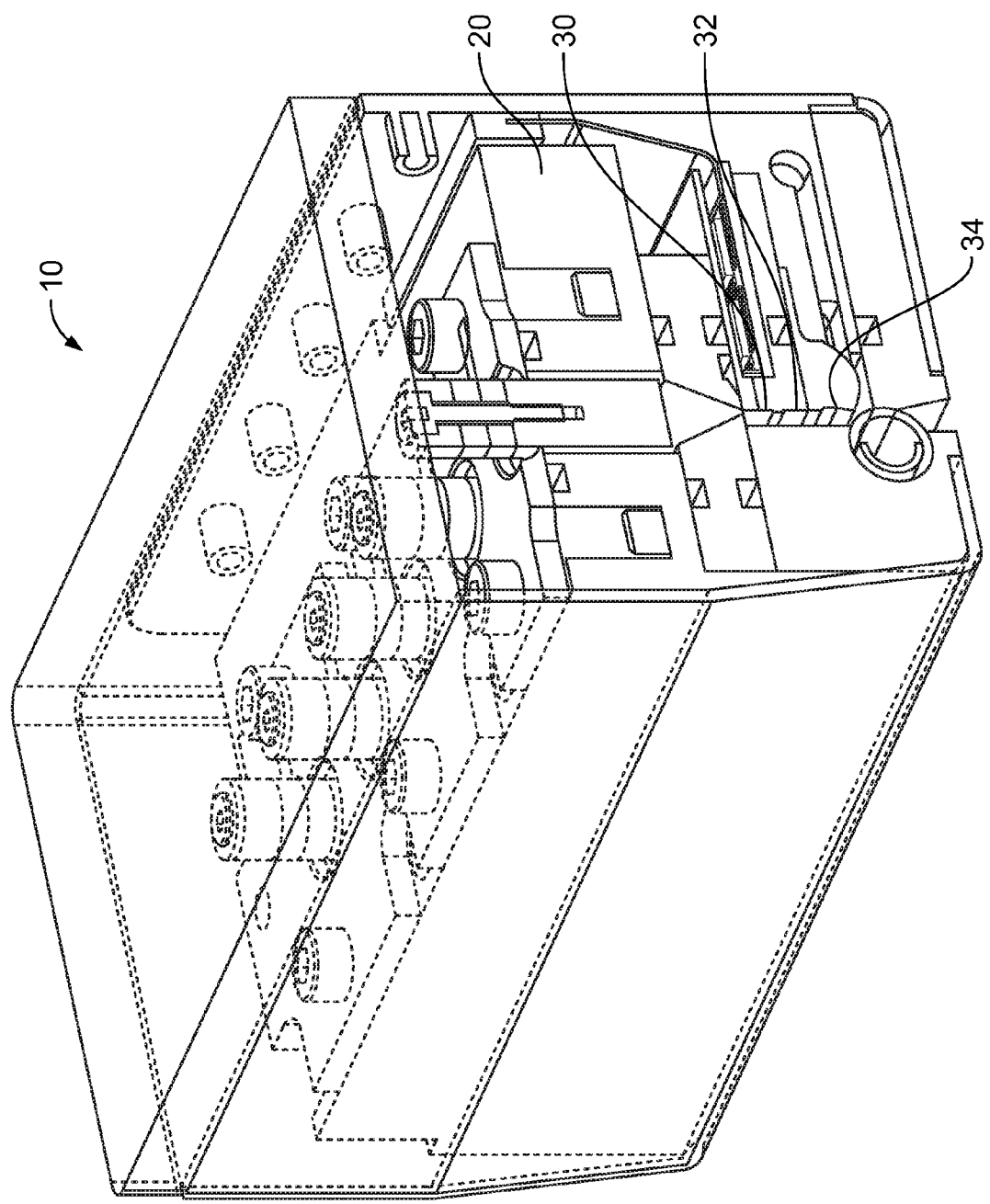
FIG. 1 is a sectional view of an embodiment of a printhead.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

The present disclosure provides a droplet generator for a continuous stream ink jet printhead. The droplet generator includes an elongate cavity for containing ink, nozzle orifices in a wall of the cavity for passing the ink from the cavity to form jets, the nozzle orifices extending along a length of the cavity; a mounting plate providing a wall of the cavity opposite the nozzle orifices; and a plurality of actuators disposed in the cavity to vibrate the ink in the cavity such that each the jet breaks up into ink droplets at substantially a same predetermined distance from the wall. Each of the plurality of actuators is integrally connected to the mounting plate by a membrane. The mounting plate and integrated actuators are preferably manufactured by laser metal sintering or laser metal melting. Laser metal sintering allows the creation of thin features (less than 500 micron thick), which are not possible with other conventional metal forming methods such as casting or molding.

In an embodiment of laser metal sintering, a CAD file representing an object is "sliced" into the layer thickness the machine will build in and downloaded to the laser metal sintering machine. In one example of laser metal sintering, the machine uses a high-powered optic laser. Inside the machine, powdered material is dispensed and fused into a solid part by melting it locally using the focused laser beam. Parts are built up additively layer by layer, typically using layers 20 micron thick. This process allows for highly complex geometries to be created directly from the 3D CAD data, fully automatically, in hours and without any tooling.

The process produces parts with high accuracy and detail resolution, good surface quality and excellent mechanical properties.

Figure 2:
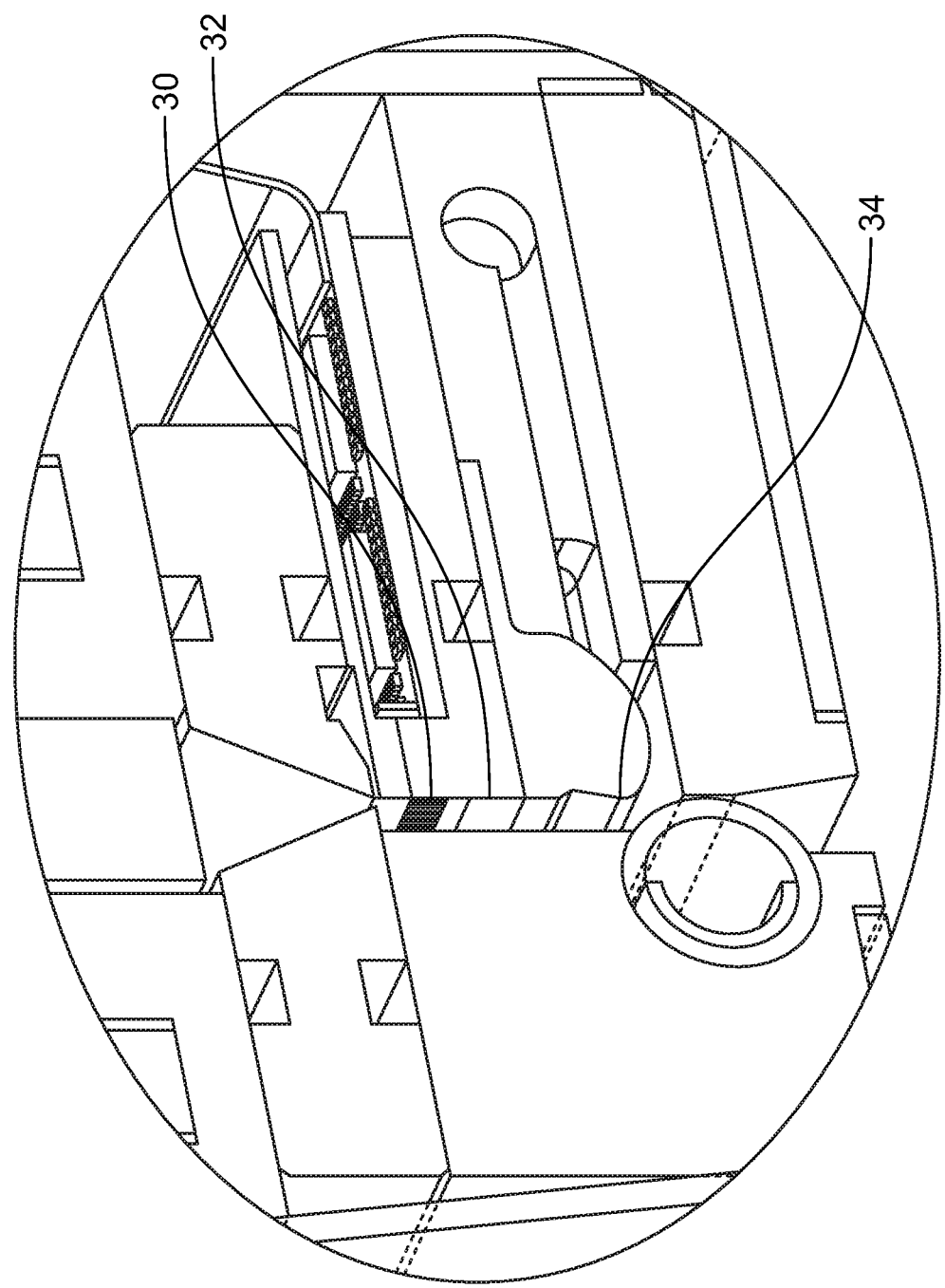
FIG. 2 is an enlarged view of a portion of FIG. 1.

FIG. 1 is a sectional view of an embodiment 10 of a printhead, with the cover shown as transparent for clarity of view. The printhead 10 is known as a binary array printhead. In binary array printing, an array of jets is ejected and modulated to produce droplets, wherein each droplet is either printed or recycled by a gutter, based on the image being printed. The printhead includes a droplet generator 20, charging electrodes 30, deflection electrodes 32, and gutter 34. FIG. 2 is an enlarged view of a portion of FIG. 1 showing the components in more detail.

Figure 6:
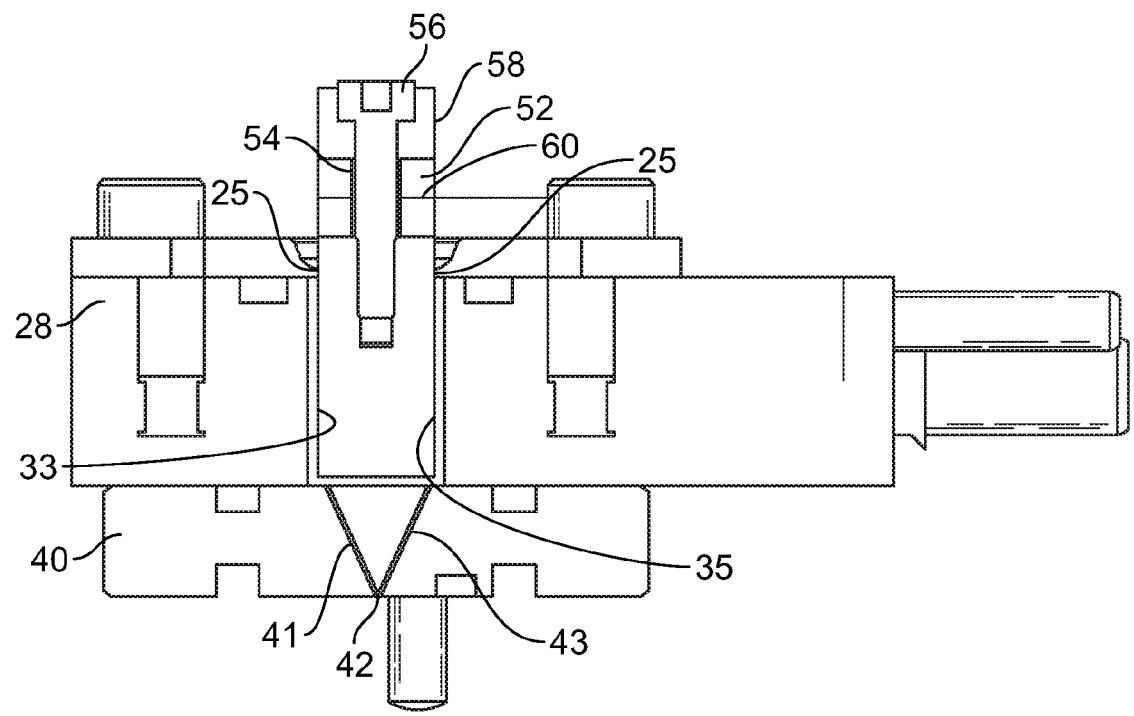
FIG. 6 is a side cross sectional view of the droplet generator of FIG. 3.

Turning now to the details of the droplet generator, FIG. 3 is a cross sectional view of an embodiment of a droplet generator. The droplet generator includes an elongate cavity 22 for containing ink. The droplet generator is defined in part by manifold 28 and mounting plate 24. Nozzle orifices 44 (as seen in FIG. 6) are provided in a wall of the cavity 22 in nozzle plate 40 for passing the ink from the cavity 22 to form jets. The nozzle orifices 44 extend along a length of the cavity 22. The mounting plate 24 provides a wall of the cavity 22 opposite the nozzle orifices 44.

A plurality of actuators 26 is disposed in the cavity 22 to vibrate the ink in the cavity such that each jet breaks up into ink droplets at substantially a same predetermined distance from the wall. Each of the plurality of actuators 26 is integrally connected to the mounting plate 24 by a membrane 25.

Each actuator 26 is provided with a driver 50 for vibrating the actuators at a fixed physical frequency and amplitude. The driver includes a cylindrical PZT (piezoelectric lead zirconium titanate) stack, which may include two PZT elements 52. A tensioning bolt 56 is provided for attaching the PZT elements 52 to the actuator 26. An insulating sleeve 54 is disposed between the tension bolt 56 and the PZT elements 52. A load mass 58 is provided to enable setting of the resonant frequency and nodal point of the device. An electrode or electrical contact 60 is connected to the PZT stack to activate the PZT elements 52.

FIG. 4A is a bottom view, and FIG. 4B is a top view of a mounting plate 24 and actuators 26 of the droplet generator 20 of FIG. 3. Each of the plurality of actuators 26 includes a top cylindrical portion 60 and a bottom portion 62 in the general shape of a truncated rectangular pyramid, flaring outwardly to each side along the length of the cavity 22. Each of the plurality of actuators comprises a rectangularly shaped addressing face 64. A gap of between 500 um and 1 mm is provided between the faces 64 of the actuators 26. The ink in cavity 22 is addressed by the lower face 64 of each actuator 26. On the top cylindrical portion 60 portion of each actuator is a cylindrical channel 66 surrounding an extending cylinder 68 with a hole or channel 70 for attachment of the driver 50.

Actuators 26 are integrally connected to the mounting plate 24 in their nodal plane by a membrane or thin layer 25. The membranes 25 function as a seal to maintain the ink in the cavity 22, while the membrane 25 is also sufficiently thin and compliant to allow independent movement of each actuator 26 via the PZT drivers without exciting significant movement in the mounting plate 24. The membrane 25 is less preferably than 500 microns, less than 300 microns, less than 250 microns, or less than 200 microns thick at its thinnest point. It is possible to produce features of such small thicknesses by laser metal sintering or laser metal melting, but not by conventional metal casting and molding techniques. In a preferred embodiment, the membrane 25 is about 200 microns thick, at its thinnest point. The transition from the mounting plate 24 to the membrane 25 and thence to the actuator 26 may be in the general shape of a parabola, as the material transitions from the relatively thicker mounting plate 26 to the relatively thinner membrane 25. This shape may be limited by the capabilities of the production method, such as the layered manufacturing process inherent in laser metal sintering. However, other shapes besides parabolic are possible, such as V-shaped or U-shaped. Mounting plate 24 includes holes 27 for attachment by fasteners 29 to the manifold 28.

Figure 5:
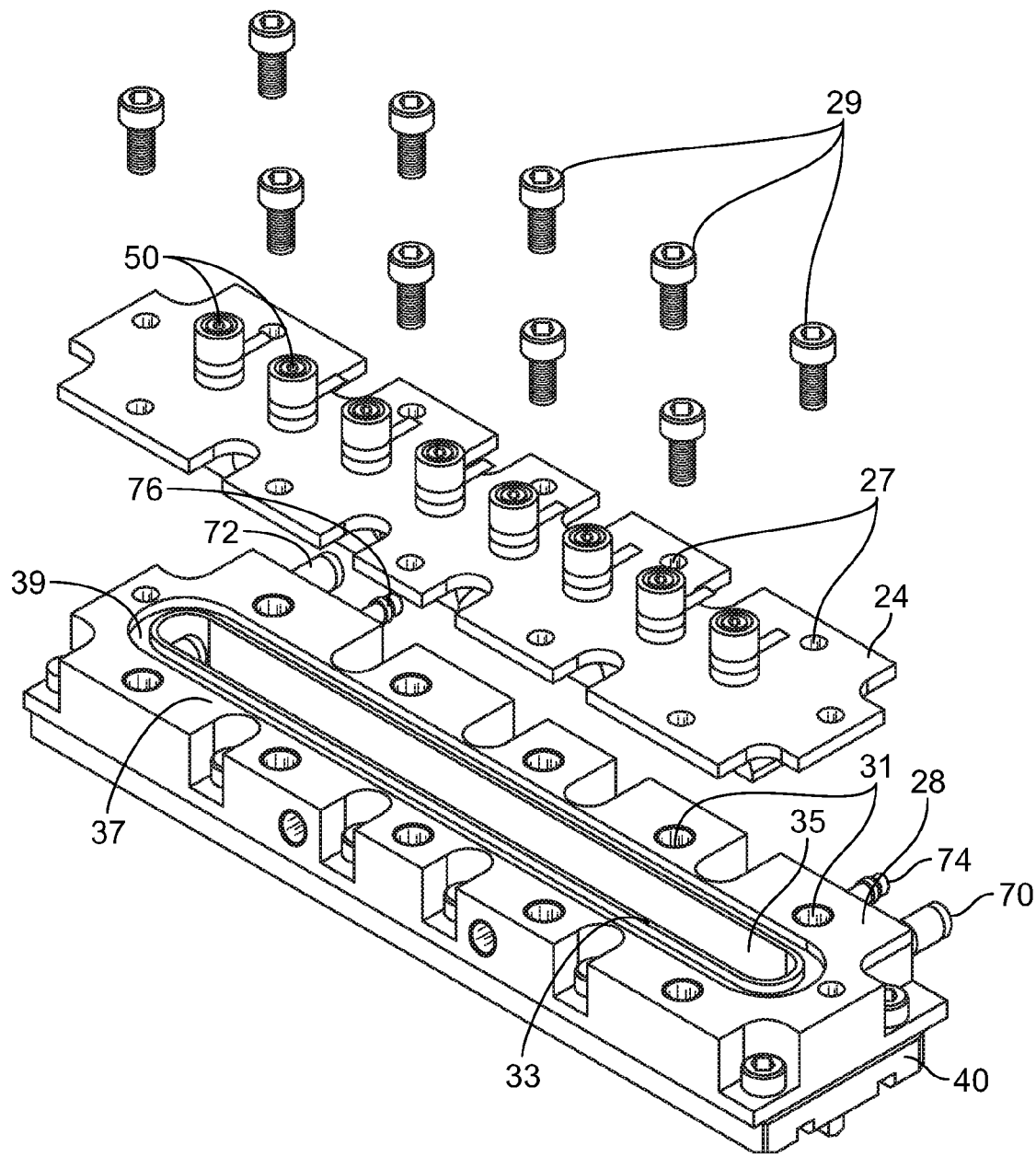
FIG. 5 is an exploded view of the droplet generator of FIG. 3.

FIG. 5 is an exploded view of the droplet generator of FIG. 3. The mounting plate 24 is attached to the manifold 28 by fasteners 29. The mounting plate 24 includes holes 27 for attachment by the fasteners 29 into receiving holes 31 in the manifold 28. The manifold 28 body forms the walls 33, 35 of the cavity 22. The manifold 28 includes a top surface 37 disposed adjacent mounting plate 24. In one embodiment, an oval or racetrack-shaped channel 39 is disposed on the top surface 37 of the manifold 28 to provide a seal (such as a gasket) between the mounting plate 24 and the manifold 28. It will be apparent that alternative sealing arrangements, such as a flat gasket between flat surfaces of the mounting plate 24 and the manifold 28, are possible. Ink inlet port 70 provides ink to the cavity 22. Ink outlet 72 provides away to remove ink from the cavity 22. Cleaning ports 74, 76 are provided to flush the cavity 22 for cleaning.

Figure 7:
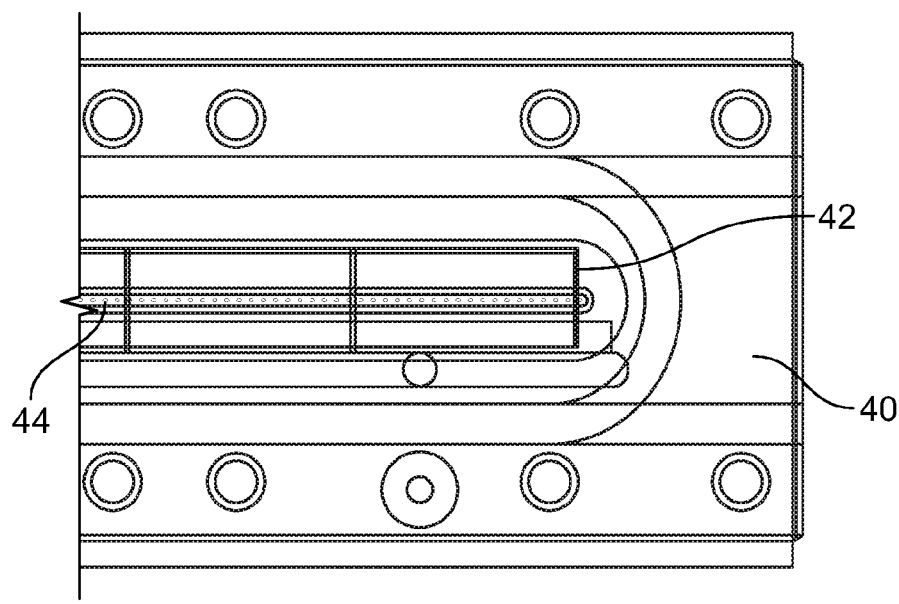
FIG. 7 is a perspective view of nozzles of the droplet generator of FIG. 3.

FIG. 6 is a side cross sectional view of the droplet generator of FIG. 3. Nozzle plate 40 is disposed under the manifold 28. Nozzle plate 40 has a narrow slit. Disposed over the narrow slit of the nozzle plate 40 is a foil 42. Nozzle plate 40 and foil insert 42 may be made of stainless steel. The foil 42 includes the nozzle orifices 44. Thus, the nozzle orifices 44 are provided in the nozzle plate foil 42 disposed adjacent the cavity 22. This arrangement provides for convenient manufacturing. Other arrangements are possible, such as having the nozzle orifices 44 integrally provided in the nozzle plate 40. FIG. 7 is a perspective view of nozzles 44 of the droplet generator of FIG. 3. It can be seen that a line of nozzle orifices 44 are provided in foil 42, which is attached to nozzle plate 40. The nozzle orifices are typically between 20 micron and 60 micron in diameter. In one embodiment, the nozzle orifices are between 35 micron and 50 micron in diameter. In one embodiment, the nozzle orifices are about 42 micron in diameter.

As best seen in FIG. 6, in one embodiment the nozzle plate 40 includes a portion defining therein a V cross-section channel, and, bonded to nozzle plate 40, a foil insert 42. Insert 42 contains a line of nozzle orifices 44, and is so bonded to nozzle plate 40 that this line runs along the length of the open apex of the V cross-section channel of nozzle plate 40. An elongate ink cavity 22 is defined by the lower faces 64 of actuators 26, and the interior faces 41, 43 which define the V cross-section channel.

In the droplet generator, actuators 26 are disposed so that their rectangular lower faces 64 lie in the same plane, in line, along cavity 22, the longer sides of each face extending along the cavity, the shorter sides being closely adjacent and parallel. The length of the lower face 64 of each actuator 26 is significantly greater than the diameter of each cylinder 60. This enables only a narrow gap 65 to be present between faces 64, while at the same time providing sufficient separation of the cylinders 60 to enable proper individual arrangement of actuators 26 in mounting plate 24. If the actuators 26 are too close together, in operation of the generator, too much vibration will be communicated from one actuator 26 to the next.

At the frequency of operation of the generator, each actuator 26 has a vertical thickness resonance at which all points across its lower face 64 vibrate vertically in phase and with the same amplitude, i.e. at which lower face 64 is driven in contact with the ink in cavity 22 in piston-like manner Each actuator 26 is disposed on mounting plate 24 at a position along its length corresponding or close to a stationary node in its resonant vibration. Actuators 26 are driven in synchronicity so that they behave collectively as a single piston-like actuator having a lower face that extends the full length and width of ink cavity 22, i.e. to cavity 22 actuators 26 appear as a single piston actuator extending its fill length and width.

Cavity 22 is shaped so as to provide a steady and essentially unidirectional flow of ink to nozzle orifices 42. The reducing surface area in the direction of wave travel (i.e. from the lower faces 64 of actuators 26 to nozzle orifices 42) causes an increased acoustic pressure at the apex of the V cross-section channel as compared to that at lower faces 64.

The advantage of the simulation by actuators 26 of a single piston actuator covering the full cavity is that the cavity need not be resonant in its vertical dimension at operating frequency. This facilitates a relaxation in the required accuracy of the physical dimensions of the structural components of the generator. It also permits a greater stray in operating parameters of the generator such as ink composition and temperature.

The combined coverage of the top face of cavity 22 by actuators 26 must be sufficiently great that non-resonant operation of the cavity is feasible. If the coverage is not enough, it will not be possible to achieve the same acoustic pressure at all nozzle orifices along the cavity, without operation of the cavity at resonance. Thus, the gaps 65 between lower faces 64 of actuators 26 must be sufficiently narrow (significantly less than a quarter wavelength in the ink), and the sides and ends of cavity 22 must be sufficiently closely approached by actuators 26, ideally overlapped thereby. In this regard, and as explained previously, in the generator described by way of example, gaps 65 are able to be narrow by virtue of each actuator lower face 65 being significantly longer than the diameter of each actuator cylinder 60. Further, by having an ink interface in the gap 65 between actuators 26, truly independent actuator vibration is still possible at very small inter-actuator distances. This is to be compared with a more solid interface where truly independent vibration breaks down at appreciably longer inter-actuator distances.

It is advantageous to use a number of independently driven actuators rather than a single actuator. When using a single actuator it is difficult to achieve the required precise piston-like motion at all points along the single actuator's length. When using a number of actuators a finer control is possible whereby the vibration of each actuator can be individually adjusted or trimmed so that at all points along the cavity there is the required piston-like motion. In particular, all actuators would be driven with the same frequency, and the phase and amplitude of the driving signal supplied to each actuator would be adjusted, as necessary, so that the actuators all vibrate in phase and with the same amplitude. This compensates for slight differences in the resonant frequencies of the actuators due to manufacturing tolerances.

The design disclosed herein has multiple advantages over prior art reference U.S. Pat. No. 6,883,899, where each cylinder is push fitted into a respective hole in a mounting plate, which hole has a diameter slightly less than that of the cylinder. The design in U.S. Pat. No. 6,883,899 includes a plate made of a compliant material to form an ink tight seal around each cylinder. In the present application, because the actuators are integrally connected to the mounting plate, there is no need for any seal between cylinders and the mounting plate. This greatly reduced the likelihood of leaks and also makes the unit easier to manufacture. Laser metal sintering or laser metal melting allows the creation of the thin membrane, which is not possible by conventional metal casting and molding techniques.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A droplet generator for a continuous stream ink jet printhead, comprising:
    an elongate cavity for containing ink;
    nozzle orifices in fluid communication with the cavity for passing the ink from the cavity as jets, the nozzle orifices forming a line of nozzle orifices, the line extending along a length of the cavity;
    a mounting plate providing a wall of the cavity opposite the nozzle orifices;
    a plurality of actuators disposed in the cavity to vibrate the ink in the cavity such that each jet breaks up into ink droplets at substantially a same predetermined distance from the wall, wherein each actuator of the plurality of actuators is discrete from other actuators, and
    a plurality of membranes, each being discrete from other membranes, and
    wherein each membrane is less than 500 microns thick.

2. The droplet generator of claim 1 wherein each actuator of the plurality of actuators comprises a bottom portion, wherein each bottom portion is separated from any adjacent bottom portions by a gap so that each bottom portion is capable of independent vibration relative to other bottom portions, wherein each bottom portion defines an ink addressing face by which it addresses the ink in the cavity, a combined coverage of the face of the cavity by the ink addressing faces of the actuators being such that the break up of the jets is achieved without resonance of the cavity in its dimension from the wall to the cavity face, the actuators being driven in synchronicity so that they behave collectively as a single piston-like actuator having an effective ink addressing face comprised as a combination of the ink addressing faces of the actuators.

3. The droplet generator of claim 1, further comprising a plurality of transitions, each transition of the plurality of transitions, wherein each transition is discrete from other transitions, connects a respective membrane to the mounting plate, and is integral to the mounting plate, wherein the transition is parabolic in cross section.

4. The droplet generator of claim 1, further comprising a plurality of transitions, each transition of the plurality of transitions, wherein each transition is discrete from other transitions, connects a respective membrane to the mounting plate, and is integral to the mounting plate, wherein the transition is U-shaped in cross section.

5. The droplet generator of claim 1, further comprising a plurality of transitions, each transition of the plurality of transitions, wherein each transition is discrete from other transitions, connects a respective membrane to the mounting plate, and is integral to the mounting plate, wherein the transition is V-shaped in cross section.

6. The droplet generator of claim 1 further comprising a plurality of drivers, each driver of the plurality of drivers being used to drive a respective actuator.

7. The droplet generator of claim 6 wherein each driver comprises a cylindrical PZT stack, a tensioning bolt for attaching the PZT stack to the actuator, an insulating sleeve disposed between the tensioning bolt and the PZT stack, and an electrode connected to the PZT stack.

8. The droplet generator of claim 1 wherein the nozzle orifices are provided in a nozzle plate foil disposed adjacent the cavity.

9. The droplet generator of claim 1 wherein the actuator is formed by direct laser metal sintering.

10. The droplet generator of claim 1 wherein the actuator is formed by direct laser metal melting.

11. The droplet generator of claim 1 wherein each of the plurality of actuators is in the general shape of a truncated rectangular pyramid.

12. The droplet generator of claim 1 wherein each of the plurality of actuators comprises a rectangularly shaped addressing face.

13. The droplet generator of claim 1 further comprising a manifold forming walls of the cavity, the manifold comprising a top surface disposed adjacent the mounting plate.

14. The droplet generator of claim 13 wherein the top surface of the manifold comprises on oval channel for providing a seal between the mounting plate and the manifold.

15. A method of manufacturing a droplet generator for a continuous stream ink jet printhead, comprising:

providing an elongate cavity for containing ink;

manufacturing by laser sintering or laser metal melting a monolithic body comprising: a mounting plate providing a wall of the cavity; a plurality of actuators, wherein each actuator of the plurality of actuators is discrete from other actuators; and a plurality of membranes, each being discrete from other membranes, where each membrane is less than 500 microns thick; and providing nozzle orifices for passing the ink from the cavity as jets, the nozzle orifices forming a line of nozzle orifices, the line extending along a length of the cavity;

wherein each actuator of the plurality of actuators comprises a bottom portion, and wherein each bottom portion is separated from any adjacent bottom portions by a gap so that each bottom portion is capable of independent vibration relative to other bottom portions, and wherein the actuators are adapted to be disposed in the cavity to vibrate the ink in the cavity to form the jets, the nozzle orifices extending along the length of the cavity.

16. The method of claim 15 further comprising providing a nozzle plate disposed opposite the mounting plate, further comprising laser welding a metal foil to the nozzle plate to provide an orifice array.

17. The method of claim 15 further comprising assembling the droplet generator into a binary array printhead.

* * * * *